(12) United States Patent
Bin Gubair et al.

(10) Patent No.: US 11,150,368 B2
(45) Date of Patent: Oct. 19, 2021

(54) FREQUENCY BASED GEOLOGICAL FEATURE DETECTION FROM SEISMIC DATA

(71) Applicant: Saudi Arabian Oil Company, Dhahran (SA)

(72) Inventors: Mohammed Saleh Bin Gubair, Dammam (SA); Maher Al Marhoon, Qatif (SA)

(73) Assignee: Saudi Arabian Oil Company, Dhahran (SA)

( * ) Notice: Subject to any disclaimer, the term of this patent is extended or adjusted under 35 U.S.C. 154(b) by 280 days.

(21) Appl. No.: 16/200,287

(22) Filed: Nov. 26, 2018

(65) Prior Publication Data

US 2020/0166664 A1    May 28, 2020

(51) Int. Cl.
*G01V 1/30* (2006.01)
*G01V 1/00* (2006.01)
*G01V 1/36* (2006.01)

(52) U.S. Cl.
CPC .............. *G01V 1/301* (2013.01); *G01V 1/003* (2013.01); *G01V 1/307* (2013.01); *G01V 1/364* (2013.01)

(58) Field of Classification Search
CPC ........ G01V 1/301; G01V 1/003; G01V 1/307; G01V 1/364; G01V 2210/643; G01V 1/345; G01V 1/302
See application file for complete search history.

(56) References Cited

U.S. PATENT DOCUMENTS

| | | | |
|---|---|---|---|
| 3,731,268 | A | 5/1973 | Landrum, Jr. |
| 5,671,136 | A | 9/1997 | Willhoit, Jr. |
| 5,894,417 | A | 4/1999 | Dorn |
| 6,131,071 | A | 10/2000 | Partyka |
| 6,498,989 | B1 | 12/2002 | Pisetski et al. |
| 7,248,539 | B2 | 7/2007 | Gorgos et al. |
| 7,398,158 | B2 | 7/2008 | Najmuddin |

(Continued)

FOREIGN PATENT DOCUMENTS

| | | |
|---|---|---|
| CN | 101545983 | 9/2009 |
| CN | 102819040 | 12/2012 |

(Continued)

OTHER PUBLICATIONS

Skidmore et al., "Avo helps seismic imaging in deepwater environments," Oil and Gas Journal, Nov. 1997, 95(44): 3 pages.

(Continued)

*Primary Examiner* — Mohammad K Islam
(74) *Attorney, Agent, or Firm* — Fish & Richardson P.C.

(57) ABSTRACT

The present disclosure describes methods and systems for interpreting geological features in a seismic volume based on mono-frequency filtering of the seismic volume. One computer-implemented method includes receiving a seismic data volume, decomposing the seismic data volume into multiple sub-volumes, generating one or more seismic horizons on each sub-volume, analyzing the generated seismic horizons for the multiple sub-volumes including determining a first sub-volume and a second sub-volume from the multiple sub-volumes, and subtracting the generated one or more seismic horizons for the first sub-volume from the generated one or more seismic horizons for the second sub-volume.

19 Claims, 8 Drawing Sheets

(56) References Cited

U.S. PATENT DOCUMENTS

| | | | |
|---|---|---|---|
| 8,265,876 | B1 | 9/2012 | Yu et al. |
| 8,849,574 | B2 | 9/2014 | Lomask |
| 2005/0125157 | A1 | 6/2005 | Toelle |
| 2011/0048731 | A1 | 3/2011 | Imhof et al. |
| 2011/0153218 | A1 | 6/2011 | Peng |
| 2012/0041682 | A1* | 2/2012 | Ramirez-Perez ...... G01V 1/364 702/17 |
| 2014/0067273 | A1 | 3/2014 | Puryear et al. |
| 2014/0247969 | A1 | 9/2014 | Srigiriraju |
| 2015/0185342 | A1 | 7/2015 | VanGroenestijn |
| 2016/0209530 | A1 | 7/2016 | Nguyen et al. |
| 2017/0160414 | A1* | 6/2017 | Sternfels ................. G01V 1/36 |
| 2018/0024263 | A1 | 1/2018 | Aarre et al. |
| 2018/0203147 | A1* | 7/2018 | Paffenholz ............. G01V 1/288 |
| 2018/0306938 | A1* | 10/2018 | Gesbert ................... G06T 15/08 |
| 2019/0227186 | A1 | 7/2019 | Gubair et al. |
| 2021/0116593 | A1 | 4/2021 | Gubair et al. |

FOREIGN PATENT DOCUMENTS

| | | |
|---|---|---|
| CN | 105093290 | 11/2015 |
| WO | WO2011109839 | 9/2011 |

OTHER PUBLICATIONS

PCT International Search Report and Written Opinion in International Appln. No. PCT/US2019/063060, dated Mar. 13, 2020, 15 pages.

Berkhout et al., "Transformation of multiples into primary reflections," SEG Technical Program Expanded Abstracts, Jan. 2003, 4 pages.

Ikwueto et al., "Advanced processing of multiples into useful seismic data for surface hydrocarbon oilfields," IOSR Journal of Applied Geology and Geophysics, Dec. 2014, 2(6):68-74.

PCT International Search Report and Written Opinion in International Appln. No. PCT/US2020/056626, dated Feb. 10, 2021, 17 pages.

International Search Report and Written Opinion issued in International Application No. PCT/US2019/014136 dated Apr. 16, 2019, 14 pages.

Giroldi et al., "Using Spectral Decomposition to Identify and Characterize Glacial Valleys and Fluvial Channels within the Carboniferous Section in Bolivia," Section: Identification and Characterization; Channel Body Picking and Tracking, the Leading Edge, vol. 24, No. 11, Nov. 1, 2005, 7 pages.

Naseer et al., "Detection of cretaceous incised-valley shale for resource play, Miano gas field, SW Pakistan: Spectral decomposition using continuous wavelet transform, Journal of Asian Earth Sciences," vol. 147, Jul. 21, 2017, 20 pages.

Zeng, "Strata slicing, part II: real 3-D seismic data," Geophysics, Society of Exploration Geophysicists, vol. 63, No. 2, Mar. 1, 1998, 9 pages.

Avseth et al., "Quantitative seismic interpretation: Applying rock physics tools to reproduce interpreation risk; Chapter 4—Common techniques for quantitative seismic interpretation," Jun. 10, 2010, 45 pages.

Bancroft and Burt, "A Frequency Synthesis Technique Using Digital Controlled Division," presented at the 18th Annual Symposium on Frequency Control, Feb. 1964, 13 pages.

Butorin and Krasnov, "Approaches to the Analysis of Spectral Decomposition for the Purpose of Detailed Geological Interpretation," SPE-182079-MS, SPE Russian Petroleum Technology Conference and Exhibition, Oct. 24-26, 2016, 15 pages.

Chopra et al., "Enhancing interpretability of seismic data with spectral decomposition phase components," SEG Technical Program Expanded Abstracts 2015, Oct. 18-23, 2015, 5 pages.

Faraklioti and Petrou, "Horizon picking in 3D seismic data volumes," Machine Vision and Applications 15.4, Aug. 17, 2004, 4 pages.

Hardage, "Instantaneous Seismic Attribute Calculated by the Hilbert Transform," Search and Discovery Article #40563 on Jul. 17, 2010, 7 pages.

Herron, "Pitfalls in horizon autopicking," Interpretation 3.1, Feb. 1, 2015, 2 pages.

Honorio et al., "Interpreting Seismic Frequency Section Based on ICA," presented at the 75th EAGE conference and exhibition incorporating SPE Europec, London, Jun. 2013, 6 pages.

Hoyes and Cheret, "A review of 'global' interpretation methods for automated 3D horizon picking," The Leading Edge 30.1, Jan. 2011, 8 pages.

Johann et al., "Spectral decomposition reveals geological hidden features in the amplitude maps from a deep water reservoir in the Campos Basin," SEG Technical Program Expanded Abstracts, Sep. 2003, 6 pages.

Montaigne, "Rational Virtualization Opens E&P Eyes," Hart's E&P, Landmark Technical Review 79, Oct. 2003, 2 pages.

Shi et al., "Prediction of Fluvial Sand Body Using the Technique of Frequency Division Interpretation," International Information and Engineering Technology Association, Environmental and Earth Sciences Research Journal, vol. 2, No. 2, 2015, 6 pages.

Yu et al., "Automatic horizon picking in 3D seismic data using optical filters and minimum spanning tree (patent pending)," SEG Technical Program Expanded Abstracts 2011, Jan. 2011, 5 pages.

Zeng, "Frequency-Dependent Seismic Stratigraphy for High-Resolution Interpretation of Depositional Sequences," adapted from an oral Presentation at AAPG Annual Convention and Exhibition, Jun. 7-10, 2009, Search and Discovery Article #40501, Apr. 5, 2010, 27 pages.

Alvarez, "Attenuation of Multiples in Image Space," Dissertation for Doctor of Philosophy, Department of Geophysics, Stanford University, Sep. 2007, 160 pages.

Cao "Analysis and Application of Radon Transform," MSC Thesis, Department of Geology and Geophysics, University of Calgary, Dec. 2006, 101 pages.

Peacock et al, "Predictive Deconvolution: Theory and Practice," Geophysics, 34, 2, Apr. 1969, pp. 155-169.

Verschuur et al, "Adaptive surface related multiple elimination," Geophysics, 57, 9, pp. 1166-1177, Sep. 1992.

Weglein et al, "Multiple Attenuation: Recent Advances and the Road Ahead", The Leading Edge, Aug. 2011, pp. 864-875.

Xiao et al, "Multiple suppression: A literature review," CREWES Research Report, vol. 15, 2003, 17 pages.

GCC Examination Report in GCC Appln. No. GC 2019-38703, dated Apr. 29, 2021, 4 pages.

* cited by examiner

US 11,150,368 B2

FREQUENCY BASED GEOLOGICAL FEATURE DETECTION FROM SEISMIC DATA

TECHNICAL FIELD

This disclosure relates to improving interpretation of geological features based on frequency content of seismic data.

BACKGROUND

Generally, a seismic volume includes frequency content over a range of frequencies, for example, from 10 Hertz (Hz) to 70 Hz. The frequency content can hold information of different geological features (such as channels and geological bodies).

SUMMARY

The present disclosure describes methods and systems, including computer-implemented methods, computer program products, and computer systems for interpreting geological features in a seismic volume based on mono-frequency filtering of the seismic volume. One computer-implemented method includes receiving a seismic data volume, decomposing the seismic data volume into multiple sub-volumes, generating one or more seismic horizons on each sub-volume, analyzing the generated seismic horizons for the multiple sub-volumes including determining a first sub-volume and a second sub-volume from the multiple sub-volumes, and subtracting the generated one or more seismic horizons for the first sub-volume from the generated one or more seismic horizons for the second sub-volume.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes the system to perform the actions. One or more computer programs can be configured to perform particular operations or actions by virtue of including instructions that, when executed by data processing apparatus, cause the apparatus to perform the actions.

The foregoing and other implementations can each, optionally, include one or more of the following features, alone or in combination:

A first aspect, combinable with the general implementation, the seismic data volume being a full stack volume including a range of frequencies, and each sub-volume is a mono-frequency sub-volume including a different single frequency.

A second aspect, combinable with any of the previous aspects, the seismic data volume decomposed into the multiple sub-volumes using multiple narrow band filters.

A third aspect, combinable with any of the previous aspects, generating one or more seismic horizons for a particular sub-volume including determining a zone in the particular sub-volume, and performing horizon picking on the determined zone of the particular sub-volume to generate the one or more seismic horizons for the particular sub-volume.

A fourth aspect, combinable with any of the previous aspects, the horizon picking being performed manually or automatically using a geological interpretation method.

A fifth aspect, combinable with any of the previous aspects, the first sub-volume including a first frequency, the second sub-volume includes a second frequency, and the second frequency is higher than the first frequency.

A sixth aspect, combinable with any of the previous aspects, further comprising displaying the subtracted seismic horizons in a map view.

A seventh aspect, combinable with any of the previous aspects, analyzing the generated seismic horizons for the multiple sub-volumes being performed in a time domain.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the following description. Other features and advantages of the disclosure will be apparent from the description and drawings, and from the claims.

BRIEF DESCRIPTION OF THE DRAWINGS

Like reference numbers and designations in the various drawings indicate like elements.

DETAILED DESCRIPTION

The following detailed description describes a method to improve geological interpretation based on frequency content of seismic data, and is presented to enable a person skilled in the art to make and use the disclosed subject matter in the context of one or more particular implementations. Various modifications, alterations, and permutations of the disclosed implementations can be made and will be readily apparent to those skilled in the art, and the general principles defined may be applied to other implementations and applications without departing from the scope of the disclosure.

Thus, the present disclosure is not intended to be limited to the described or illustrated implementations, but is to be accorded the widest scope consistent with the principles and features disclosed.

Generally, a seismic volume can include frequency content over a range of frequencies (such as from 10 Hertz (Hz) to 70 Hz). The frequency content can hold information of different geological features (such as channels and geological bodies). Different geological features can be seen at different frequencies due to multiple factors (such as size and thickness) of the geological features. For example, large geological features (such as layer boundaries (horizons)) can be seen at low frequencies. Small geological features (such as small geological bodies) can be seen at high frequencies. However, small geological features may not be visible due to the effect of other large geological features. As a result, picking geological horizons on a full stack volume (that is, a seismic volume containing a range of frequencies) may produce seismic imaging of geological features at low quality (or resolution) (that is, missing small geological features).

At a high level, the described approach provides a method to improve interpretation of different geological features using frequency content of seismic data. For example, instead of picking geological horizons on a full stack seismic volume, the full stack seismic volume is first decomposed into multiple sub-volumes. Each sub-volume consists of a single frequency (that is, a mono-frequency sub-volume). Then, horizon picking is performed on each sub-volume of the multiple sub-volumes. Seismic horizons picked on a low frequency sub-volume can be subtracted from seismic horizons picked on a high frequency sub-volume to produce seismic imaging of geological features. As a result, geological interpretation can be achieved at high resolution (that is, small geological features can be observed and interpreted), thereby improving seismic imaging quality of individual geological features at a particular frequency.

Figure 1:
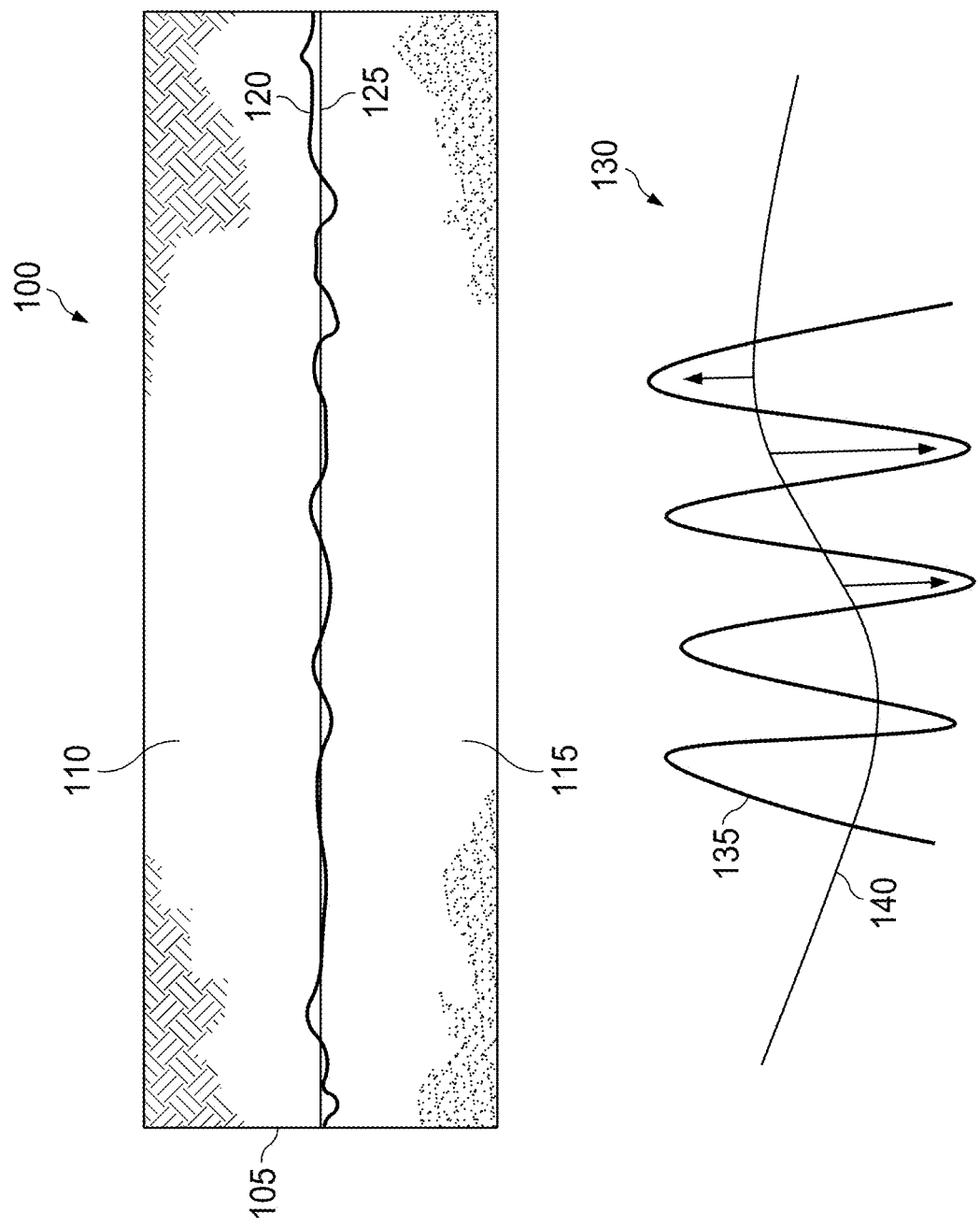
FIG. 1 illustrates an example diagram of picked horizons, according to some implementations.

FIG. 1 illustrates an example diagram 100 of picked horizons, according to some implementations. As illustrated in FIG. 1, a cross-sectional view 105 of a subsurface includes two different geological layers 110 and 115. Two horizons (or boundaries) 120 and 125 between the layer 110 and the layer 115 are picked at two different frequencies. For example, the horizon 120 is picked at a higher frequency of the two different frequencies, and the horizon 125 is picked at a lower frequency of the two different frequencies. A closer view 130 shows parts of the two picked horizons (that is, horizons 120 and 125 in the cross-sectional view 105). For example, a horizon 135 is part of the horizon 120 picked at the higher frequency, and a horizon 140 is part of the horizon 125 picked at the lower frequency. As illustrated in FIG. 1, the horizon 135 picked at the higher frequency shows more geological details than the horizon 140 picked at the lower frequency. In other words, large geological features can be seen from both the horizon 135 picked at the higher frequency and the horizon 140 picked at the lower frequency. Small geological features can be seen from the horizon 135 picked at the higher frequency. However, small geological features cannot be seen from the horizon 140 picked at the lower frequency.

Figure 2:
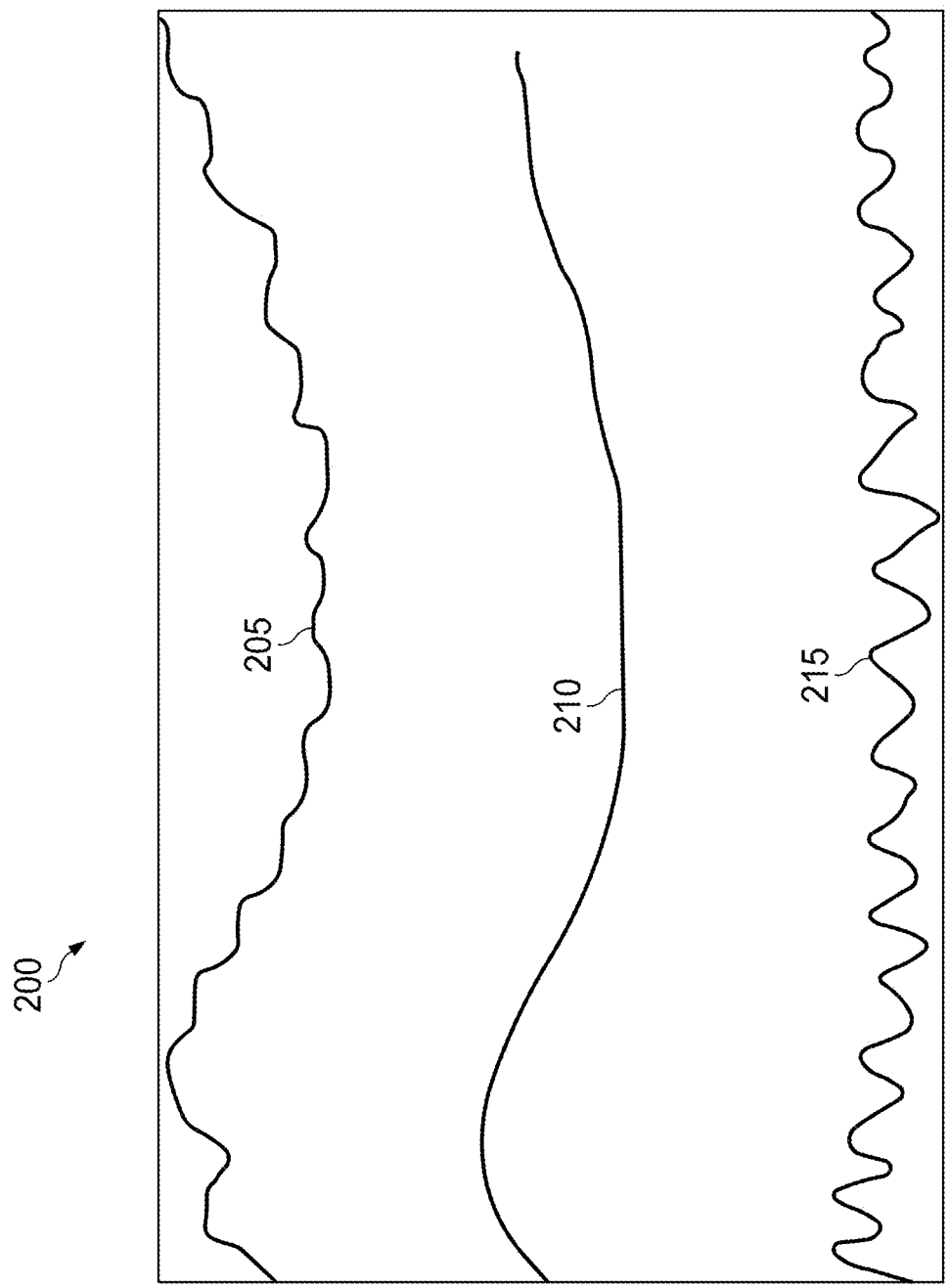
FIG. 2 illustrates another example diagram of picked horizons, according to some implementations.

FIG. 2 illustrates another example diagram 200 of picked horizons, according to some implementations. As illustrated in FIG. 2, three seismic horizons, 205, 210, and 215, are shown in a cross-sectional view of a seismic volume, and represent a same horizon in the seismic volume. The seismic horizon 205 and the seismic horizon 210 are picked from two different frequency sub-volumes of the seismic volume (that is, a high frequency sub-volume and a low frequency sub-volume decomposed from the seismic volume). For example, the seismic horizon 205 is picked from the high frequency sub-volume, and the seismic horizon 210 is picked from the low frequency sub-volume. As illustrated in FIG. 2, the seismic horizon 205 picked from the high frequency sub-volume shows more geological details than the seismic horizon 210 picked from the low frequency sub-volume. In other words, both small and large geological features can be seen from the seismic horizon 205, while only large geological features can be seen from the seismic horizon 210.

By subtracting the seismic horizon 210 from the seismic horizon 205, the seismic horizon 215 can be obtained. In doing so, similar (or same) geological features, mainly large geological features, in both seismic horizons 205 and 210 can be removed from the seismic horizon 210. As a result, geological interpretation from the seismic horizon 215 has a higher resolution than geological interpretation from the seismic horizons 205 and 210. In other words, by subtracting seismic horizon(s) picked at a low frequency (such as the seismic horizon 210) from seismic horizon(s) picked at a high frequency (such as the seismic horizon 205), effects of large geological features on the high frequency can be reduced, thereby enhancing visibility of small geological features at the high frequency.

Figure 3:
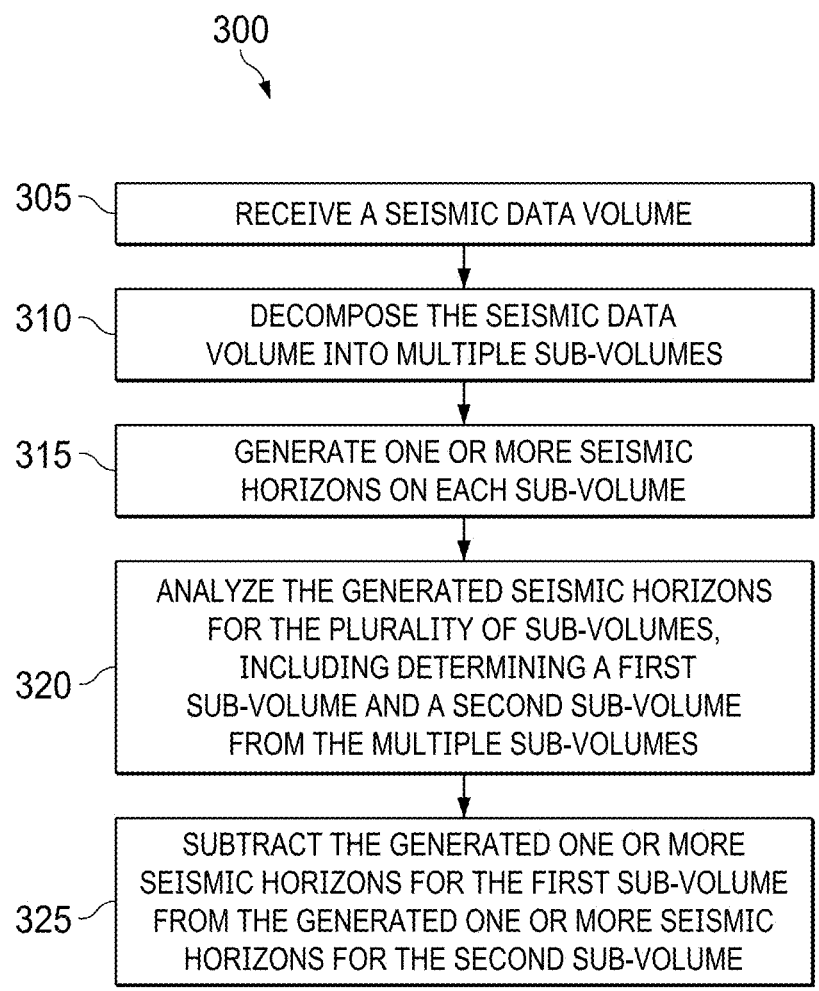
FIG. 3 is a flowchart illustrating an example method for frequency based geological interpretation, according to some implementations.

FIG. 3 is a flowchart illustrating an example method 300 for frequency based geological interpretation, according to some implementations. For clarity of presentation, the description that follows generally describes method 300 in the context of the other figures in this description. For example, method 300 can be performed by a computer system described in FIG. 8. However, it will be understood that method 300 may be performed, for example, by any suitable system, environment, software, and hardware, or a combination of systems, environments, software, and hardware, as appropriate. In some implementations, various steps of method 300 can be run in parallel, in combination, in loops, or in any order.

The method 300 starts at block 305 where a seismic data volume is received. In some implementations, the seismic data volume can be a three dimensional (3D) seismic data volume obtained through a geophysical exploration of a subsurface. In some implementations, the seismic data volume can be a full stack volume that includes a full range of frequencies, for example, from 8 Hz to 80 Hz. In some implementations, the seismic data volume can be seismic signals having a frequency band.

At block 310, the seismic data volume is decomposed into multiple sub-volumes. Each sub-volume can be a mono-frequency sub-volume that includes a different single frequency. In some implementations, decomposing the seismic data volume can be performed using narrow band filters. For example, passing the seismic data volume through a 30 Hz narrow band filter can produce a 30 Hz sub-volume.

At block 315, one or more seismic horizons are generated on each sub-volume of the multiple sub-volumes. In some implementations, generating a seismic horizon on a sub-volume can be performed using seismic horizon picking that is based on following (or tracking) the signal with similar features (such as peak, trough, or zero crossing) in the sub-volume. The seismic horizon picking can be performed manually, automatically, or both manually and automatically. In some implementations, for a particular sub-volume, a zone of interest can be determined in the particular sub-volume. Seismic horizon picking can be performed within the determined zone of interest to generate one or more seismic horizons using, for example, a geological interpretation method. In some implementations, same horizon(s) can be generated (or picked) on different sub-volumes, resulting in different interpretations for the same horizon(s) at different frequencies.

At block 320, the generated seismic horizons for the multiple sub-volumes are analyzed. The analysis can be performed manually, automatically, or both manually and automatically. In some implementations, analyzing the generated seismic horizons for the multiple sub-volumes can be performed in a time domain. In some implementations, analyzing the generated seismic horizons for the multiple sub-volumes can include determining a first sub-volume and a second sub-volume from the multiple sub-volumes. The first sub-volume includes a first frequency, the second sub-volume includes a second frequency, and the second frequency is higher than the first frequency. For example, the first and second sub-volumes can be selected from the multiple sub-volumes, because seismic horizons generated from the first and second sub-volumes show more geological features of interest than seismic horizons generated from other sub-volumes. In other words, most, if not all, geological features of interest can be seen in the seismic horizons generated from the first and second sub-volumes. In doing so, subtraction can be performed, at next block 325, between the seismic horizons generated from the first and second sub-volumes, rather than subtracting all the generated seismic horizons for the multiple sub-volumes from each other. As a result, the total number of subtraction performed in the method 300 can be reduced, thereby reducing the time required for interpreting geological features in the seismic data volume.

At block 325, the generated one or more seismic horizons for the first sub-volume are subtracted from the generated one or more seismic horizons for the second sub-volume. In some implementations, a simple subtracting operation (such as the seismic calculator in PETREL®) can be used. By subtracting the generated seismic horizons for the first sub-volume from the generated seismic horizons for the second sub-volume, similar geological features in both the first and second sub-volumes can be eliminated. For example, large geological features are visible at different frequencies in general. After the subtraction, large geological features shown in both the first and second sub-volumes are removed, and small geological features became visible. Therefore, subtracting seismic horizons at different frequencies from each other can reduce the effect of large geological features, and enhance visibility of small geological features, thereby producing high resolution geological interpretation.

In some implementations, more than two sub-volumes can be determined from the multiple sub-volumes at block 320. For example, after analyzing the generated seismic horizons for the multiple sub-volumes, it is determined that geological features of interest can be seen, mainly, in seismic horizons generated from three sub-volumes, V1, V2, and V3. As a result, subtraction can be performed for all the seismic horizons from each other. For example, seismic horizons generated from V1 can be subtracted from seismic horizons generated from V2, seismic horizons generated from V1 can be subtracted from seismic horizons generated from V3, and seismic horizons generated from V2 can be subtracted from seismic horizons generated from V3.

The example method 300 shown in FIG. 3 can be modified or reconfigured to include additional, fewer, or different steps (not shown in FIG. 3), which can be performed in the order shown or in a different order. For example, after block 325, the subtracted seismic horizons can be displayed in a map view for geological feature interpretation. In some implementations, the subtracted seismic horizons can be displayed in a cross-sectional view for geological feature interpretation. In some implementations, the displayed map view (or the displayed cross-sectional view) of the subtracted seismic horizons can be used to locate potential areas for drilling, or to identify lateral extent of a reservoir or a subsurface geological body/feature. In some implementations, one or more of the steps shown in FIG. 3 can be repeated or reiterated, for example, until a terminating condition is reached. In some implementations, one or more of the individual steps shown in FIG. 3 can be executed as multiple separate steps, or one or more subsets of the steps shown in FIG. 3 can be combined and executed as a single step. In some implementations, one or more of the individual steps shown in FIG. 3 may also be omitted from the example method 300.

Figure 4:
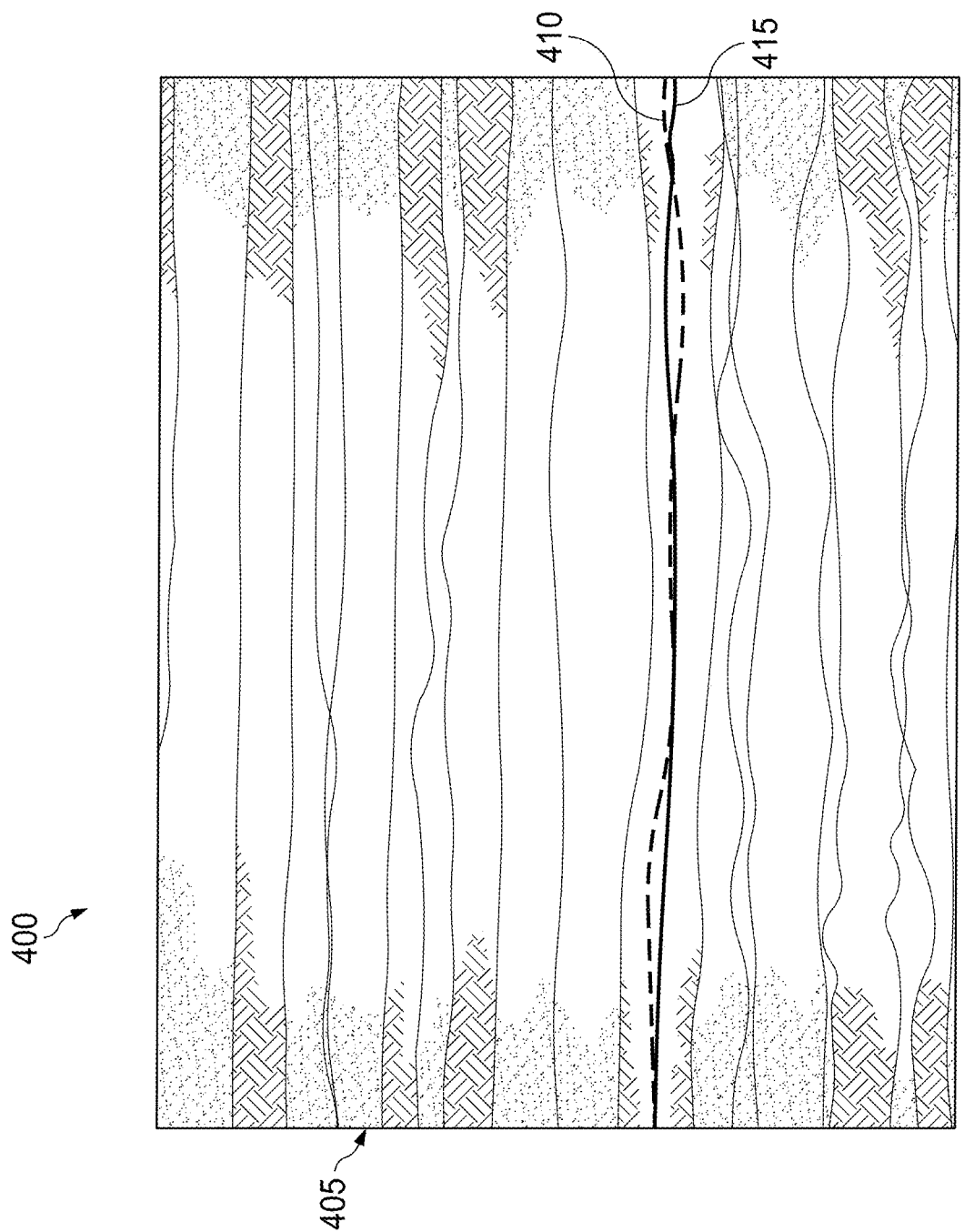
FIG. 4 is a diagram illustrating an example snapshot of seismic horizons picked on different frequency sub-volumes, according to some implementations.

FIG. 4 is a diagram illustrating an example snapshot 400 of seismic horizons picked on different frequency sub-volumes, according to some implementations. As illustrated in FIG. 4, a cross-sectional view of a seismic volume 405 is displayed. Two seismic horizons 410 and 415 are picked at two different frequency sub-volumes for the same horizon in the seismic volume 405. For example, the seismic horizon 410 is picked on a 40 Hz frequency sub-volume of the seismic volume 405, and the seismic horizon 415 is picked on a 10 Hz frequency sub-volume of the seismic volume 405.

Figure 5:
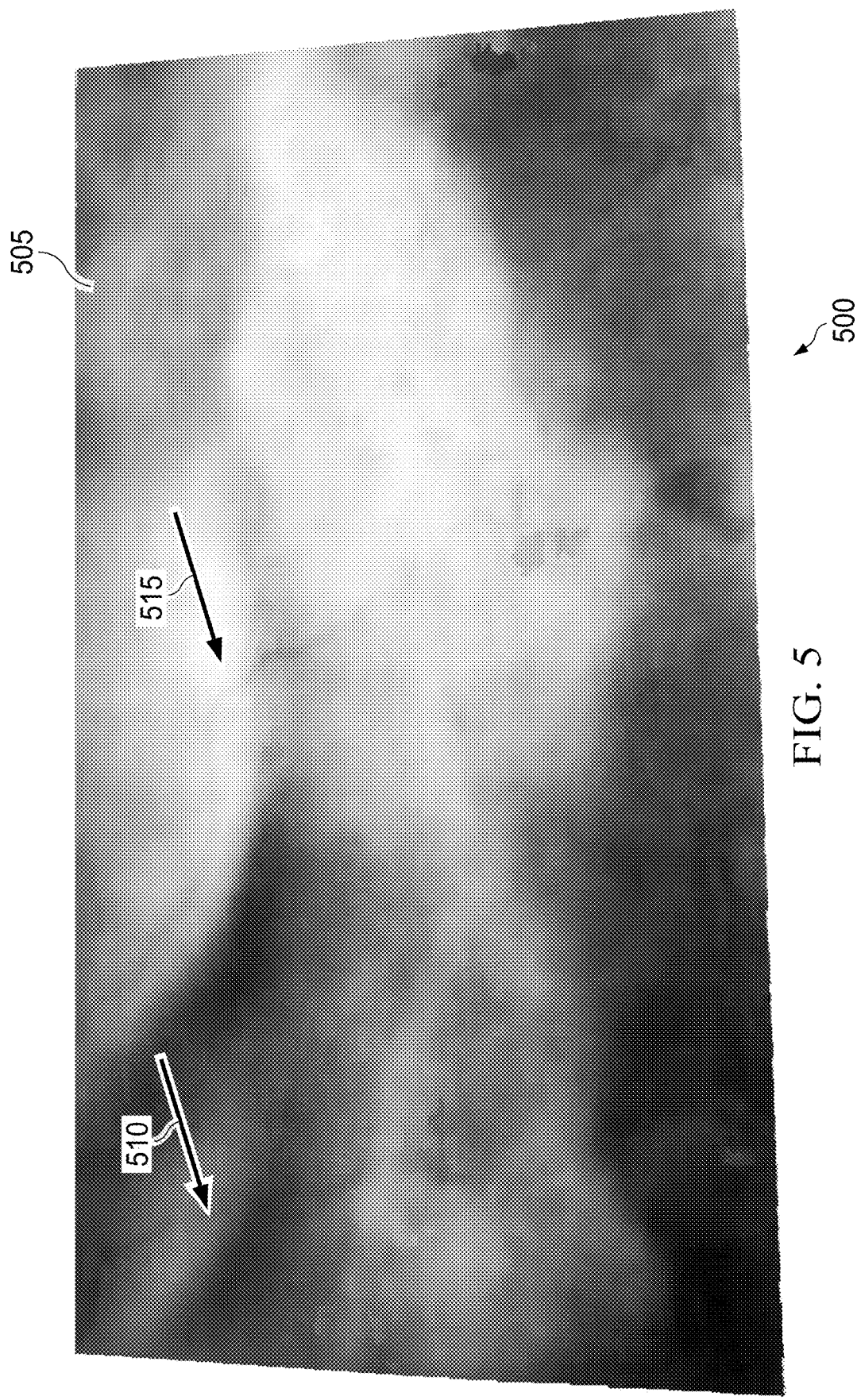
FIG. 5 is an example map view of a horizon picked on a 10 Hz sub-volume in a time domain, according to some implementations.

FIG. 5 is an example map view 500 of a horizon picked on a 10 Hz sub-volume in a time domain, according to some implementations. The horizon shown, in a map view, in FIG. 5 is the same horizon (that is, the seismic horizon 415) shown, in a cross-sectional view, in FIG. 4. As illustrated in FIG. 5, a map view of a 10 Hz sub-volume 505 includes geological features 510 and 515 visible at 10 Hz.

Figure 6:
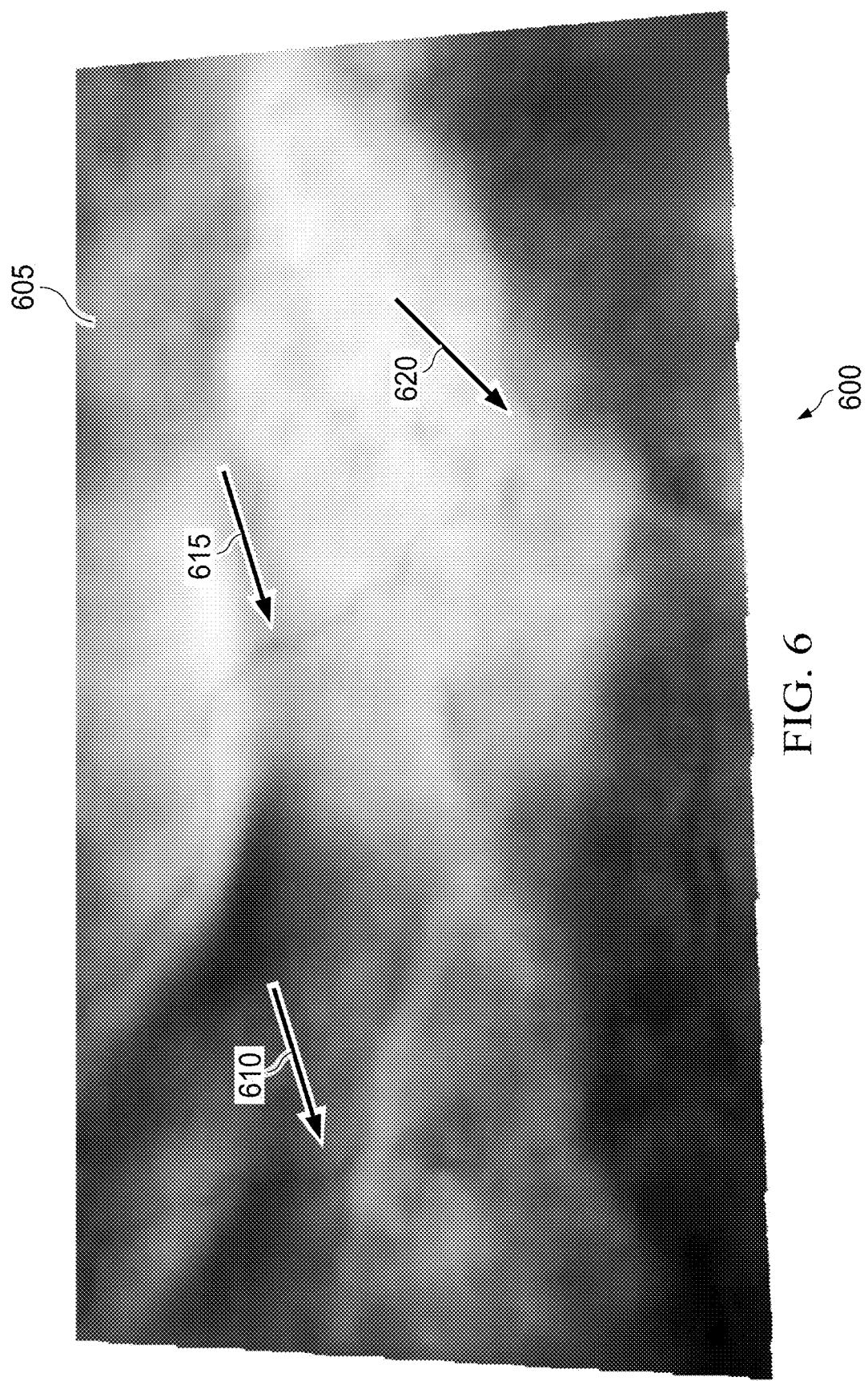
FIG. 6 is an example map view of a horizon picked on a 40 Hz sub-volume in a time domain, according to some implementations.

FIG. 6 is an example map view 600 of a horizon picked on a 40 Hz sub-volume in a time domain, according to some implementations. The horizon shown, in a map view in FIG. 6 is the same horizon (that is, the seismic horizon 410) shown, in a cross-sectional view, in FIG. 4. As illustrated in FIG. 6, a map view of a 40 Hz sub-volume 605 includes geological features 610, 615, and 620 visible at 40 Hz. The geological features 510 and 515 in FIG. 5 and the geological features 610, 615, and 620 in FIG. 6 indicate some of the feature differences visible at different frequencies (that is, 10 Hz and 40 Hz).

Figure 7:
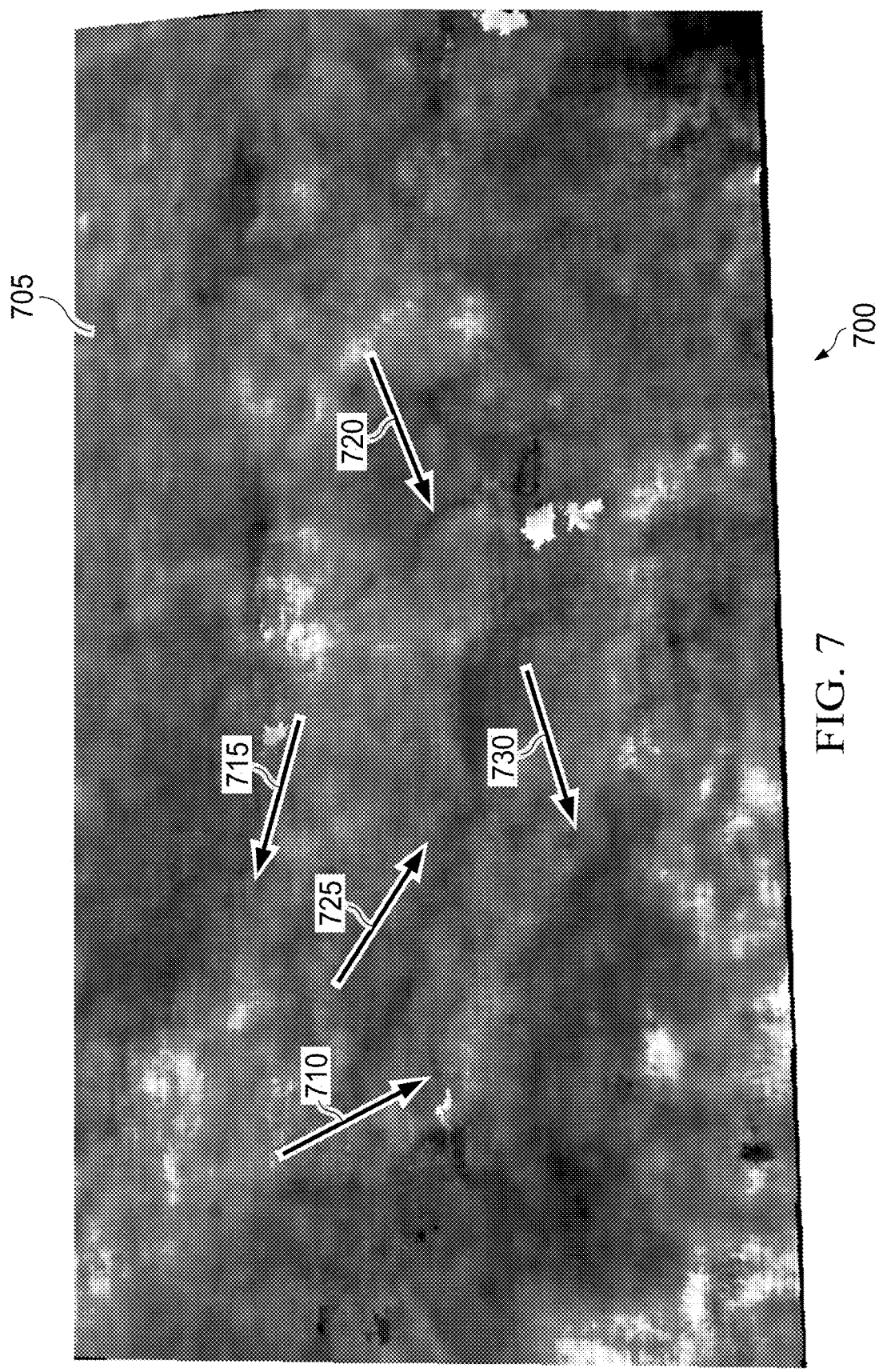
FIG. 7 is an example map view of geological interpretation based on differences between a horizon picked on a 40 Hz sub-volume and a horizon picked on a 10 Hz sub-volume, according to some implementations.

FIG. 7 is an example map view 700 of geological interpretation based on differences between a horizon picked on a 40 Hz sub-volume and a horizon picked on a 10 Hz sub-volume, according to some implementations. As illustrated in FIG. 7, a map view of a seismic volume 705 shows the results of subtracting the horizon picked on the 10 Hz sub-volume (that is, the horizon in FIG. 5) from the horizon picked on the 40 Hz sub-volume (that is, the horizon in FIG. 6). The seismic volume 705 includes geological features 710, 715, 720, 725, and 730. Comparing with FIG. 5 and FIG. 6, resolution of geological features 710, 715, and 720 are improved. As a result, visibility of geological features 710, 715, and 720 are enhanced. In addition, geological features 725 and 730, visible in neither FIG. 5 nor FIG. 6, can be seen after performing a subtracting operation (such as, block 325 described in FIG. 3).

Figure 8:
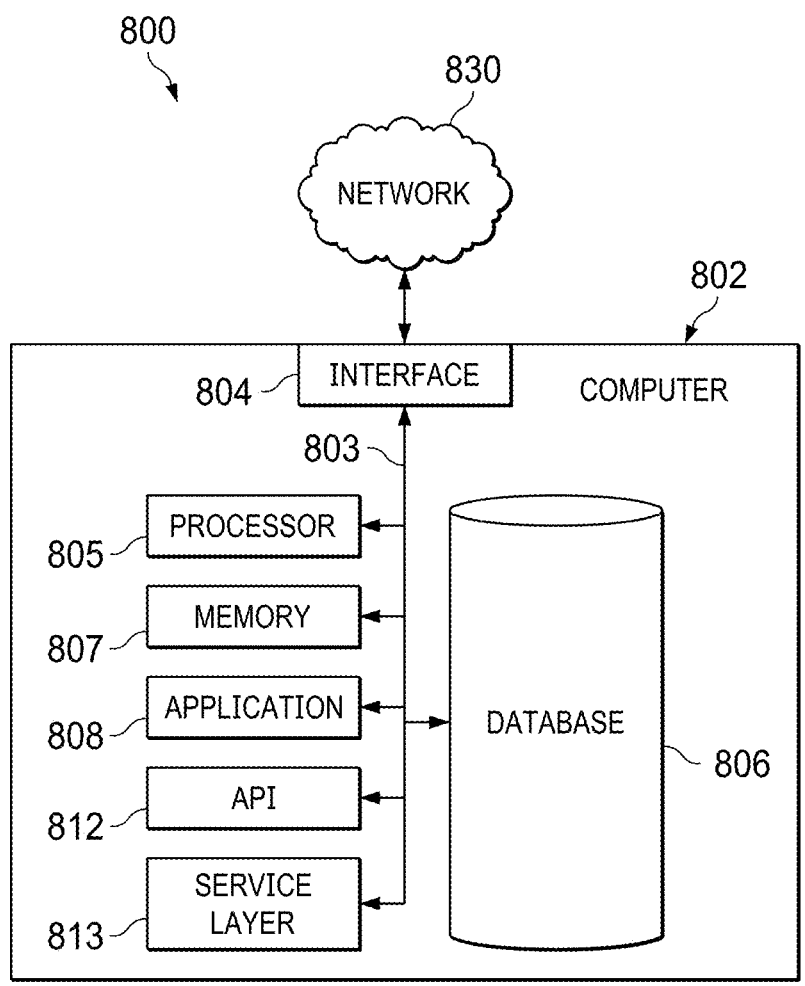
FIG. 8 is a block diagram illustrating an example computer system used to provide computational functionalities associated with described algorithms, methods, functions, processes, flows, and procedures as described in the instant disclosure, according to some implementations.

FIG. 8 is a block diagram of an example computer system 800 used to provide computational functionalities associated with described algorithms, methods, functions, processes, flows, and procedures as described in the instant disclosure, according to an implementation. The illustrated computer 802 is intended to encompass any computing device such as a server, desktop computer, laptop/notebook computer, wireless data port, smart phone, personal data assistant (PDA), tablet computing device, or one or more processors within these devices, or any other suitable processing device, including physical or virtual instances (or both) of the computing device. Additionally, the computer 802 may comprise a computer that includes an input device, such as a keypad, keyboard, or touch screen, or other device that can accept user information, and an output device that conveys information associated with the operation of the computer 802, including digital data, visual, or audio information (or a combination of information), or a graphical user interface (GUI).

The computer 802 can serve in a role as a client, network component, a server, a database or other persistency, or any other component (or a combination of roles) of a computer system for performing the subject matter described in the instant disclosure. The illustrated computer 802 is communicably coupled with a network 830. In some implementations, one or more components of the computer 802 may be configured to operate within environments, including cloud-computing-based, local, or global, or other environment (or a combination of environments).

At a high level, the computer 802 is an electronic computing device operable to receive, transmit, process, store, or manage data and information associated with the described subject matter. According to some implementations, the computer 802 may also include or be communicably coupled with an application server, e-mail server, web server, caching server, or streaming data server, or other server (or a combination of servers).

The computer 802 can receive requests over network 830 from a client application (for example, executing on another computer) and respond to the received requests by processing the received requests using the appropriate software application(s). In addition, requests may also be sent to the computer 802 from internal users (for example, from a command console or by other appropriate access methods), external or third-parties, other automated applications, as well as any other appropriate entities, individuals, systems, or computers.

Each of the components of the computer 802 can communicate using a system bus 803. In some implementations, any or all of the components of the computer 802, both hardware or software (or a combination of hardware and software), may interface with each other or the interface 804 (or a combination of both) over the system bus 803 using an application programming interface (API) 812 or a service layer 813 (or a combination of the API 812 and service layer 813). The API 812 may include specifications for routines, data structures, and object classes. The API 812 may be either computer-language independent or dependent and may refer to a complete interface, a single function, or even a set of APIs. The service layer 813 provides software services to the computer 802 or other components (whether or not illustrated) that are communicably coupled to the computer 802. The functionality of the computer 802 may be accessible for all service consumers using this service layer. Software services, such as those provided by the service layer 813, provide reusable, defined functionalities through a defined interface. For example, the interface may be software written in JAVA, or C++, or other suitable language providing data in extensible markup language (XML) format or other suitable format. While illustrated as an integrated component of the computer 802, alternative implementations may illustrate the API 812 or the service layer 813 as stand-alone components in relation to other components of the computer 802 or other components (whether or not illustrated) that are communicably coupled to the computer 802. Moreover, any or all parts of the API 812 or the service layer 813 may be implemented as child or sub-modules of another software module, enterprise application, or hardware module, without departing from the scope of this disclosure.

The computer 802 includes an interface 804. Although illustrated as a single interface 804 in FIG. 8, two or more interfaces 804 may be used according to particular needs, desires, or particular implementations of the computer 802. The interface 804 is used by the computer 802 for communicating with other systems that are connected to the network 830 (whether illustrated or not) in a distributed environment. Generally, the interface 804 comprises logic encoded in software or hardware (or a combination of software and hardware) and is operable to communicate with the network 830. More specifically, the interface 804 may comprise software supporting one or more communication protocols associated with communications such that the network 830 or interface's hardware is operable to communicate physical signals within and outside of the illustrated computer 802.

The computer 802 includes a processor 805. Although illustrated as a single processor 805 in FIG. 8, two or more processors may be used according to particular needs, desires, or particular implementations of the computer 802. Generally, the processor 805 executes instructions and manipulates data to perform the operations of the computer 802 and any algorithms, methods, functions, processes, flows, and procedures as described in the instant disclosure.

The computer 802 also includes a database 806 that can hold data for the computer 802 or other components (or a combination of both) that can be connected to the network 830 (whether illustrated or not). For example, database 806 can be an in-memory, or conventional, or other type of database storing data consistent with this disclosure. In some implementations, database 806 can be a combination of two or more different database types (for example, a hybrid in-memory and conventional database) according to particular needs, desires, or particular implementations of the computer 802 and the described functionality. Although illustrated as a single database 806 in FIG. 8, two or more databases (of the same or combination of types) can be used according to particular needs, desires, or particular implementations of the computer 802 and the described functionality. While database 806 is illustrated as an integral component of the computer 802, in alternative implementations, database 806 can be external to the computer 802.

The computer 802 also includes a memory 807 that can hold data for the computer 802 or other components (or a combination of both) that can be connected to the network 830 (whether illustrated or not). For example, memory 807 can be random access memory (RAM), read-only memory (ROM), optical, magnetic, and the like, storing data consistent with this disclosure. In some implementations, memory 807 can be a combination of two or more different types of memory (for example, a combination of RAM and magnetic storage) according to particular needs, desires, or particular implementations of the computer 802 and the described functionality. Although illustrated as a single memory 807 in FIG. 8, two or more memories 807 (of the same or a combination of types) can be used according to particular needs, desires, or particular implementations of the computer 802 and the described functionality. While memory 807 is illustrated as an integral component of the computer

802, in alternative implementations, memory 807 can be external to the computer 802.

The application 808 is an algorithmic software engine providing functionality according to particular needs, desires, or particular implementations of the computer 802, particularly with respect to functionality described in this disclosure. For example, application 808 can serve as one or more components, modules, or applications. Further, although illustrated as a single application 808, the application 808 may be implemented as multiple applications 808 on the computer 802. In addition, although illustrated as integral to the computer 802, in alternative implementations, the application 808 can be external to the computer 802.

There may be any number of computers 802 associated with, or external to, a computer system containing computer 802, each computer 802 communicating over network 830. Further, the term "client", "user", and other appropriate terminology may be used interchangeably, as appropriate, without departing from the scope of this disclosure. Moreover, this disclosure contemplates that many users may use one computer 802, or that one user may use multiple computers 802.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include, special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS, or any other suitable conventional operating system.

A computer program, which may also be referred to or be described as a program, software, a software application, a module, a software module, a script, or code can be written in any form of programming language, including compiled or interpreted languages, or declarative or procedural languages, and it can be deployed in any form, including as a stand-alone program or as a module, component, or subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, or methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks.

The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20, or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously-described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously-described implementations should not be understood as requiring such separation or integration in all implementations, and it should be understood that the described program components and systems can generally be integrated together in a single software product or packaged into multiple software products.

Accordingly, the previously-described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

The invention claimed is:

1. A method comprising:
receiving a seismic data volume;
decomposing the seismic data volume into a plurality of sub-volumes;
generating one or more seismic horizons on each sub-volume;
analyzing the generated seismic horizons for the plurality of sub-volumes, wherein analyzing the generated seismic horizons for the plurality of sub-volumes includes determining a first sub-volume and a second sub-volume from the plurality of sub-volumes; and
subtracting a first seismic horizon generated on the first sub-volume from a second seismic horizon generated on the second sub-volume to obtain a subtracted seismic horizon, wherein the first sub-volume is a mono-frequency sub-volume including a first frequency, wherein the second sub-volume is a mono-frequency sub-volume including a second frequency, wherein the second frequency is higher than the first frequency, and wherein a geological feature shown in both the first seismic horizon and the second seismic horizon is not shown in the subtracted seismic horizon.

2. The method of claim 1, wherein the seismic data volume is a full stack volume including a range of frequencies, and each sub-volume is a mono-frequency sub-volume including a different single frequency.

3. The method of claim 1, wherein the seismic data volume is decomposed into the plurality of sub-volumes using a plurality of narrow band filters.

4. The method of claim 1, wherein generating one or more seismic horizons for a particular sub-volume includes:
determining a zone in the particular sub-volume; and
performing horizon picking on the determined zone of the particular sub-volume to generate the one or more seismic horizons for the particular sub-volume.

5. The method of claim 4, wherein the horizon picking is performed manually or automatically using a geological interpretation method.

6. The method of claim 1, further comprising displaying the subtracted seismic horizon in a map view.

7. The method of claim 1, wherein analyzing the generated seismic horizons for the plurality of sub-volumes is performed in a time domain.

8. The method of claim 1, wherein geological interpretation from the subtracted seismic horizon has a higher resolution than geological interpretation from the second seismic horizon.

9. A device comprising:
a memory; and
a processing unit that is arranged to perform operations including:
receiving a seismic data volume;
decomposing the seismic data volume into a plurality of sub-volumes;
generating one or more seismic horizons on each sub-volume;
analyzing the generated seismic horizons for the plurality of sub-volumes, wherein analyzing the generated seismic horizons for the plurality of sub-volumes includes determining a first sub-volume and a second sub-volume from the plurality of sub-volumes; and
subtracting a first seismic horizon generated on the first sub-volume from a second seismic horizon generated on the second sub-volume to obtain a subtracted seismic horizon, wherein the first sub-volume is a mono-frequency sub-volume including a first frequency, wherein the second sub-volume is a mono-frequency sub-volume including a second frequency, wherein the second frequency is higher than the first frequency, and wherein a geological feature shown in both the first seismic horizon and the second seismic horizon is not shown in the subtracted seismic horizon.

10. The device of claim 9, wherein the seismic data volume is a full stack volume including a range of frequencies, and each sub-volume is a mono-frequency sub-volume including a different single frequency.

11. The device of claim 9, wherein the seismic data volume is decomposed into the plurality of sub-volumes using a plurality of narrow band filters.

12. The device of claim 9, wherein generating one or more seismic horizons for a particular sub-volume includes:
determining a zone in the particular sub-volume; and
performing horizon picking on the determined zone of the particular sub-volume to generate the one or more seismic horizons for the particular sub-volume.

13. The device of claim 9, wherein the horizon picking is performed manually or automatically using a geological interpretation method.

14. The device of claim 9, the operations further comprising displaying the subtracted seismic horizon in a map view.

15. The device of claim 9, wherein analyzing the generated seismic horizons for the plurality of sub-volumes is performed in a time domain.

16. A non-transitory computer-readable medium storing instructions executable by a computer system to perform operations comprising:
receiving a seismic data volume;
decomposing the seismic data volume into a plurality of sub-volumes;
generating one or more seismic horizons on each sub-volume;
analyzing the generated seismic horizons for the plurality of sub-volumes, wherein analyzing the generated seismic horizons for the plurality of sub-volumes includes determining a first sub-volume and a second sub-volume from the plurality of sub-volumes; and
subtracting a first seismic horizon generated on the first sub-volume from a second seismic horizon generated on the second sub-volume to obtain a subtracted seismic horizon, wherein the first sub-volume is a mono-frequency sub-volume including a first frequency, wherein the second sub-volume is a mono-frequency sub-volume including a second frequency, wherein the second frequency is higher than the first frequency, and wherein a geological feature shown in both the first seismic horizon and the second seismic horizon is not shown in the subtracted seismic horizon.

17. The non-transitory computer-readable medium of claim 16, wherein the seismic data volume is a full stack volume including a range of frequencies, and each sub-volume is a mono-frequency sub-volume including a different single frequency.

18. The non-transitory computer-readable medium of claim 16, wherein the seismic data volume is decomposed into the plurality of sub-volumes using a plurality of narrow band filters.

19. The non-transitory computer-readable medium of claim 16, wherein generating one or more seismic horizons for a particular sub-volume includes:
   determining a zone in the particular sub-volume; and
   performing horizon picking on the determined zone of the particular sub-volume to generate the one or more seismic horizons for the particular sub-volume.

* * * * *